United States Patent [19]
Watkins

[11] Patent Number: 5,854,911
[45] Date of Patent: Dec. 29, 1998

[54] DATA BUFFER PREFETCH APPARATUS AND METHOD

[75] Inventor: John E. Watkins, Sunnyvale, Calif.

[73] Assignee: Sun Microsystems, Inc., Mountain View, Calif.

[21] Appl. No.: 675,263

[22] Filed: Jul. 1, 1996

[51] Int. Cl.[6] .............................. G06F 13/12; G06F 13/14
[52] U.S. Cl. .................... 395/383; 395/383; 395/421.03; 395/375; 711/213; 711/123; 711/118
[58] Field of Search ..................................... 395/250, 445, 395/375; 370/447; 364/200

[56] References Cited

U.S. PATENT DOCUMENTS

| | | | |
|---|---|---|---|
| 4,157,587 | 6/1979 | Joyce et al. ............................... | 364/200 |
| 5,345,560 | 9/1994 | Miura et al. ............................. | 395/250 |
| 5,553,254 | 9/1996 | Berstis et al. ............................ | 395/375 |
| 5,602,853 | 2/1997 | Ben-Michael et al. .................. | 370/474 |
| 5,715,425 | 2/1998 | Goldman et al. ....................... | 395/445 |

*Primary Examiner*—Curtis A. Kuntz
*Assistant Examiner*—Hassen A. Mia
*Attorney, Agent, or Firm*—Blakely Sokoloff Taylor & Zafman

[57] ABSTRACT

A prefetch apparatus optimizes bandwidth in a computer network by prefetch accessing data blocks prior to their demand in an ATM network thereby effectively reducing memory read latency. The method of the preferred embodiment includes the steps of: 1) computing a prefetch address of a next sequential data block given an address of a requested data block; 2) comparing a current request address against a previously computed prefetch address; and 3) generating a hit/miss indication corresponding to whether the current request address matches the previously computed prefetch address.

22 Claims, 6 Drawing Sheets

DATA BUFFER PREFETCH APPARATUS AND METHOD

BACKGROUND OF THE INVENTION

1. Cross-References to Related Applications

The present application is related to the following co-pending U.S. patent application:

U.S. patent application entitled, "Implementation of high speed synchronous state machine with short set up and hold time signal," having application Ser. No. 08/673,116, filed on Jul. 1, 1996, and assigned to the assignee of the present invention.

2. Field of the Invention

The present invention relates to the field of data input/output (I/O) or computer networking. Specifically, the present invention relates to input/output (I/O) data buffering in a computer network.

3. Description of Related Art

With the emergence of multimedia communications, networks are now being required to support multiple data types. As a result, network manufacturers are tending to concentrate their efforts toward asynchronous transfer mode ("ATM") networks. In ATM networks, a large number of virtual channels, perhaps tens or hundreds, can be in operation simultaneously. Each virtual channel requires an exclusive page or pages of virtual memory. Accesses are made into or out of these pages of memory. It is essential that these accesses be performed in a time critical manner. In a high performance network interface, latency and bandwidth to host memory are crucial to a maintaining sustained peak link rate.

A network interface must achieve a sustained bandwidth on the host input/output (I/O) bus of at least the link rate. In very high performance network interfaces, this requires high bandwidth from the I/O bus and an efficient design of the bus interface. It is important to provide an efficient bus interface to maximize bandwidth and reduce latency.

Arbitration time for an I/O bus can decrease overall bandwidth and increase latency; because, proper bus protocol on most high speed I/O busses precludes a device from acquiring and holding ownership of the bus without transferring data thereby blocking other bus devices access to the I/O bus.

Conventional look ahead or prefetch logic has been unsuccessful in its application to ATM systems for a number of reasons. First, there has not been a capability for preventing access to unmapped memory locations during prefetch cycles or for not generating wasteful bus cycles due to unsuccessful prefetch speculation. Secondly, conventional prefetching schemes in an ATM system can quickly become unduly complex when they accommodate prefetch cache misses, descriptor accesses embedded in a data stream access, write data intermixed with read data, and general prefetch buffer cache management. Finally, in the ATM context, a prefetch protocol cannot take priority over demand accesses from other data generators needing to access the I/O bus.

Thus, an apparatus is needed to optimize packet transmission bandwidth by accessing transmit data buffers prior to the time of their demand access by the ATM system thereby effectively reducing memory read latency.

SUMMARY OF THE INVENTION

The present invention is an apparatus is needed to optimize packet transmission bandwidth by prefetch accessing transmit data buffers prior to the time of their demand for access by the ATM system thereby effectively reducing memory read latency. Overall bandwidth is also increased due to overlapped read data access and read data processing. The present invention improves the operation of a computer network by prefetch accessing a data block prior to demand. The method of the preferred embodiment comprises the steps of: 1) computing a prefetch address of a next sequential data block given an address of a requested data block; 2) comparing a current request address against a previously computed prefetch address; and 3) generating a hit/miss indication corresponding to whether the current request address matches the previously computed prefetch address.

Other features of the present invention will be apparent from the accompanying drawings and from the detailed description which follows.

BRIEF DESCRIPTION OF THE DRAWINGS

The present invention is illustrated by way of example and not limitation in the accompanying drawings, in which.

DETAILED DESCRIPTION OF THE PREFERRED EMBODIMENT

A method and apparatus is described for optimizing packet transmission bandwidth in a computer network by prefetch accessing transmit data buffers prior to demand by the ATM system thereby effectively reducing memory read latency. In the following description, for purposes of explanation, numerous specific details are set forth in order to provide a thorough understanding of the present invention. It will be evident, however, to one skilled in the art that the present invention may be practiced without these specific details. In other instances, well-known structures, interfaces, and devices are shown in block diagram form in order to avoid unnecessarily obscuring the present invention.

Figure 1:
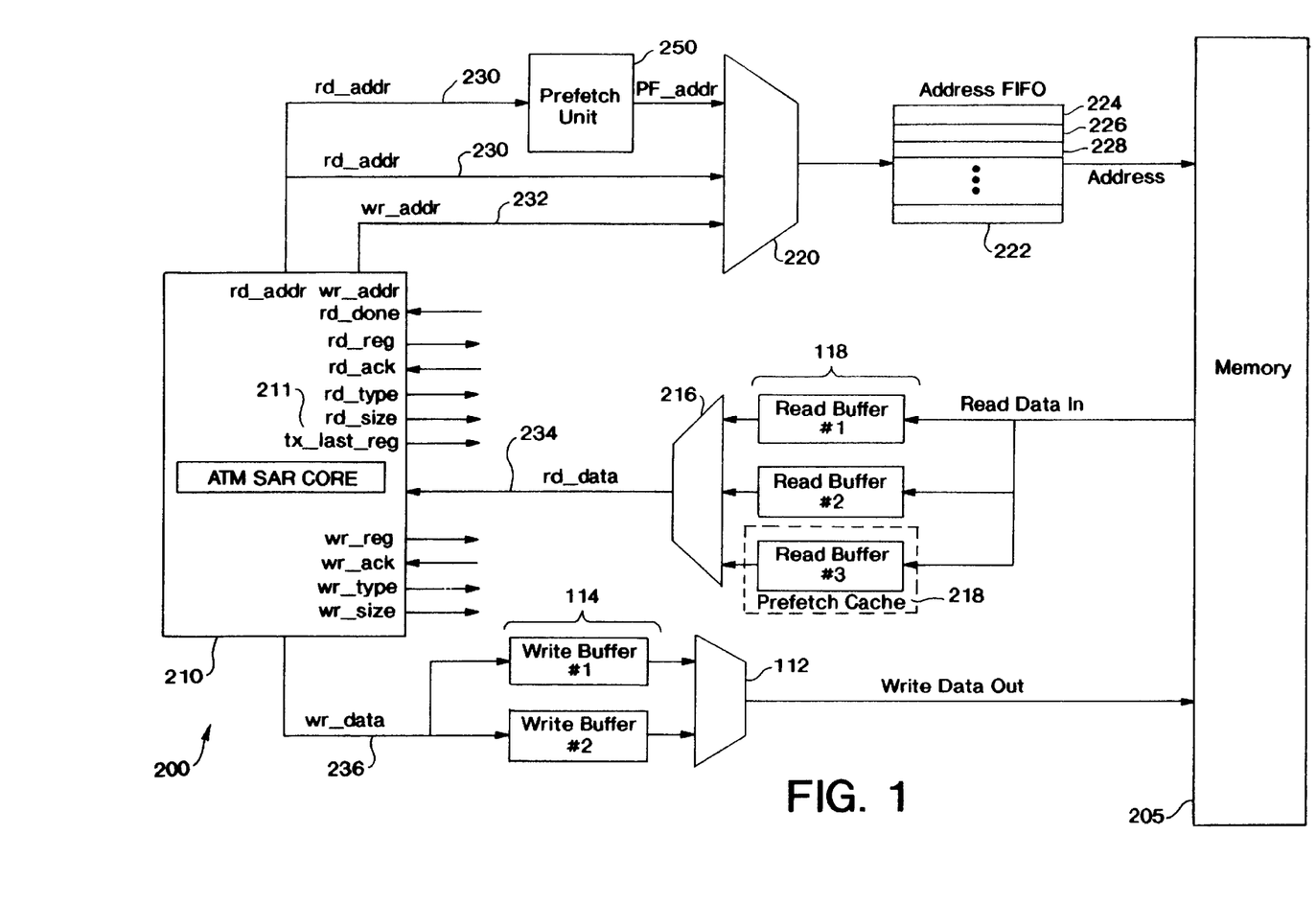
FIG. 1 illustrates the system architecture of the preferred embodiment of the present invention.

FIG. 1 illustrates the preferred embodiment of the prefetch apparatus of the present invention as coupled to an ATM core and an I/O bus interface in an improved ATM system 200. The ATM core 210 includes a segmentation and reassembly ("SAR") unit which facilitates cellification and reassembly of data cells (e.g., a standard ATM cell absent a checksum byte) and utilizes off-chip memory for storage. The ATM core 210 exchanges data cells with an ATM/physical interface (not shown) conforming to the well-known Universal Test and Operations Physical Interface for ATM ("UTOPIA") standard. The ATM/physical interface is positioned to insert a checksum in a header of an out-going data cell to produce an ATM cell or to calculate whether the checksum of an incoming ATM cell is correct, and if so, removing the checksum before transferring the data cell into the ATM core 210. A physical layer is implemented for proper electrical voltage line termination. The details of the ATM core 210 are described in detail in the above-referenced co-pending patent applications.

The ATM core 310 accesses read data blocks and write data blocks, free buffer and data buffer descriptors, and status related descriptors (not shown) all located in host memory 205. These data blocks and descriptors are well known to those of ordinary skill in the art of ATM networks. Other information used by ATM core 210 is also stored in memory 205. ATM core 210 accesses memory 205 through a bus interface comprising write buffers 114 on write data out signal lines, read buffers 118 on read data in signal lines, and an address first-in/first-out (FIFO) buffer 222 on the address signal lines. A conventional double buffering scheme is used in the preferred embodiment to couple the ATM core 210 to the bus interface on the read data and write data paths. In a conventional configuration, the double write buffers 114 provide a first write buffer #1 and a second write buffer #2 multiplexed together with multiplexer 112, the input of which is selected using a well-known round-robin state machine (not shown). Similarly, in a conventional configuration, the double read buffers #1 and #2 of read buffers 118 provide a first read buffer #1 and a second read buffer #2 multiplexed together with multiplexer 216, the input of which is selected using a well-known round-robin state machine (not shown). The third read buffer 218 in the read datapath is a prefetch cache affiliated with the prefetch mechanism of the present invention and is described in more detail below. Any of these buffers 118 may act as the prefetch cache 218 as the access to these buffers 118 rotates around in round-robin fashion. Again, this is described in more detail below. Each buffer 118 is $2^{SZ}$ bytes large where SZ represents the number of bits contained in the size field (rdsize or wrsize). Incoming data on read requests flows into the read buffers 118 in round-robin fashion on each burst read cycle from the ATM core 210. Similarly, outgoing data on write requests flows into the two double buffers #1 and #2 of write buffers 114 alternating between them on each burst write cycle from the ATM core 210.

To provide more efficient coupling of the ATM core 210 to the memory bus interface, particularly should the two be operating from different clock frequencies, addresses from the ATM core 210 are queued in an address FIFO configured to provide a plurality of storage locations (e.g. 224–228) for a plurality of addresses associated with currently pending or prefetch memory 205 data access requests. Address FIFO 222 buffers hold read, prefetch, or write request addresses until they can be serviced by memory 205.

ATM core 210 feeds these read request addresses on rd addr bus 230 or write request addresses on wraddr bus 232 to address FIFO 222 through multiplexer 220, the input of which is selected using signal from the prefetch control state machine described below. In the present invention, a prefetch unit 250 is added in parallel on the rdaddr bus 230 and coupled on the output side to multiplexer 220. In the manner described below, prefetch unit 250 applies the address associated with read requests to memory 205 at an earlier timing stage than previously accomplished.

A read access is initiated by the ATM core 210 of the preferred embodiment when a read request signal (rd req) is asserted thereby signifying that a read from the memory locations of memory 205 starting at the address on the rdaddr bus 230 and ending rdsize bytes later is requested. The rdsize signal is another signal output by ATM core 210 as shown in FIG. 1. It will be apparent to those of ordinary skill in the art that other means may equivalently be used to represent the length of a requested block of memory. The type of data to be accessed (i.e. data buffer, buffer descriptor, completion descriptor, etc.) is indicated on the rdtype signal lines also output by ATM core 210. Again, it will be apparent to those of ordinary skill in the art that other means may equivalently be used to represent the type of information desired. The read address applied to rdaddr bus 230 is selected in multiplexer 220 and the read request address is stored in the next available location in address FIFO 222 using conventional means. When the read request address moves to the top of the address FIFO 222, the read request address is output to memory 205. Once memory 205 is able to respond to the rd req and rdaddr signals of the read request, the requested data is presented on rddata bus 234 through read data buffers 118 and through multiplexer 216. The rdack signal is asserted to indicate the address on the rdaddr bus 230 has been latched by the bus interface logic and the ATM core 210 is free to change the current address on the rdaddr bus 230 to the next address. This allows a limited pipelining effect of the address signals. Another signal, rddone, (shown in FIG. 3) indicates the presence of valid data on rd data bus 234. The read request terminates when the read data is taken by ATM core 210.

Write requests are similarly initiated by using the wr req, wraddr, wrtype and wrsize signals also shown in FIG. 1. Separate read and write data busses in addition to the previous signals allow overlapped read and write operations. Write data alternates between each of the write buffers 114 with each wrreq initiated burst write cycle from the ATM core 210. In the preferred embodiment, the rdsize and wr size fields imply a maximum read or write operation of $2^{SZ}$ bytes where SZ represents the number of bits contained in the size field (rdsize or wrsize). It will be apparent to those of ordinary skill in the art that other size limits may equivalently be imposed.

The ATM core 210 of the preferred embodiment also includes a transmit last request (txlastreq) signal 211 output by ATM core 211. The txlastreq signal is asserted by ATM core 211 when a request is made for a last block in a sequence of requests for contiguous data blocks. This signal eliminates the need for other logic to check for an access to memory beyond a page or segment boundary.

Prefetch Apparatus of the Preferred Embodiment

There are three sources of addresses into the address FIFO 222 shown in FIG. 1. There are the basic read and write address sources provided on the rdaddr bus 230 and the wr addr bus 232, respectively and a prefetch address source (pfaddr) provided on the output side of prefetch unit 250. For a read request, the address on the rdaddr bus 230 defines the location in memory 205 where a requested block of data begins. The size of the block is defined by the rd size value. Typically, memory blocks are requested from memory 205 in consecutive blocks. Thus, it is likely that a read request for a block of data starting at location A will be followed by a subsequent read request for a data block starting, at location A+rdsize, where rdsize is the block size requested in the previous request. The present invention uses this typical characteristic of read requests to optimize the presentation of addresses to address FIFO 222. When the prefetch capability of the present invention is enabled, the prefetch unit 250 formulates the prefetch address (pf addr) of the next consecutive block of data in memory 205 beyond the data block currently being requested by the ATM core 210 on rdaddr bus 230. This address of the prefetch block (pfaddr) is placed into the address FIFO 222 in addition to the address (rdaddr) of the block of data actually being requested. Thus, the prefetch address is queued in address FIFO 222 by prefetch unit 250 prior to the actual request for that data block being received from ATM core 210. The prefetch unit 250 of the present invention controls when a prefetch is to occur as described in more detail below in connection with FIG. 2.

The three read buffers 118 shown in the FIG. 1 are all used when prefetching is enabled. It will be apparent to those of ordinary skill in the art that a different number of buffers in the read data path may equivalently be used. The "prefetch cache" 218 is not specifically designated to one of these buffers but the prefetch cache rotates its position amongst the three data buffers 118. A key to the simplicity of the present invention is that the data presented on the rddata bus 234 always rotates in order through the N (where N=3 in the example shown in FIG. 1) buffers to provide the burst of data requested regardless whether the operation resulted in a prefetch cache miss or hit, if the access was to a transmit data buffer (TXDB) or to a descriptor, or even if the prefetch cache was disabled. Specific conditions control deposit of read data into the buffers but the reading out of data proceeds in a purely sequential order between buffers 118 under all circumstances.

The basic idea of the present invention is when reading in a data packet larger than 64 bytes in the preferred embodiment, the three read buffers 118 can be used to maximize throughput and reduce read latency. During prefetch operation, the ATM core 210 is reading the data from a prior read request from a first buffer A of data buffers 118, a second buffer B of data buffers 118 is getting filled with read data from the current read request, and a third buffer C of data buffers 118 is being filled with the data ATM core 210 is most likely to want next. This concurrency of operation is enabled in part by the address pipelining provided by the rdack signal as described above.

Figure 2:
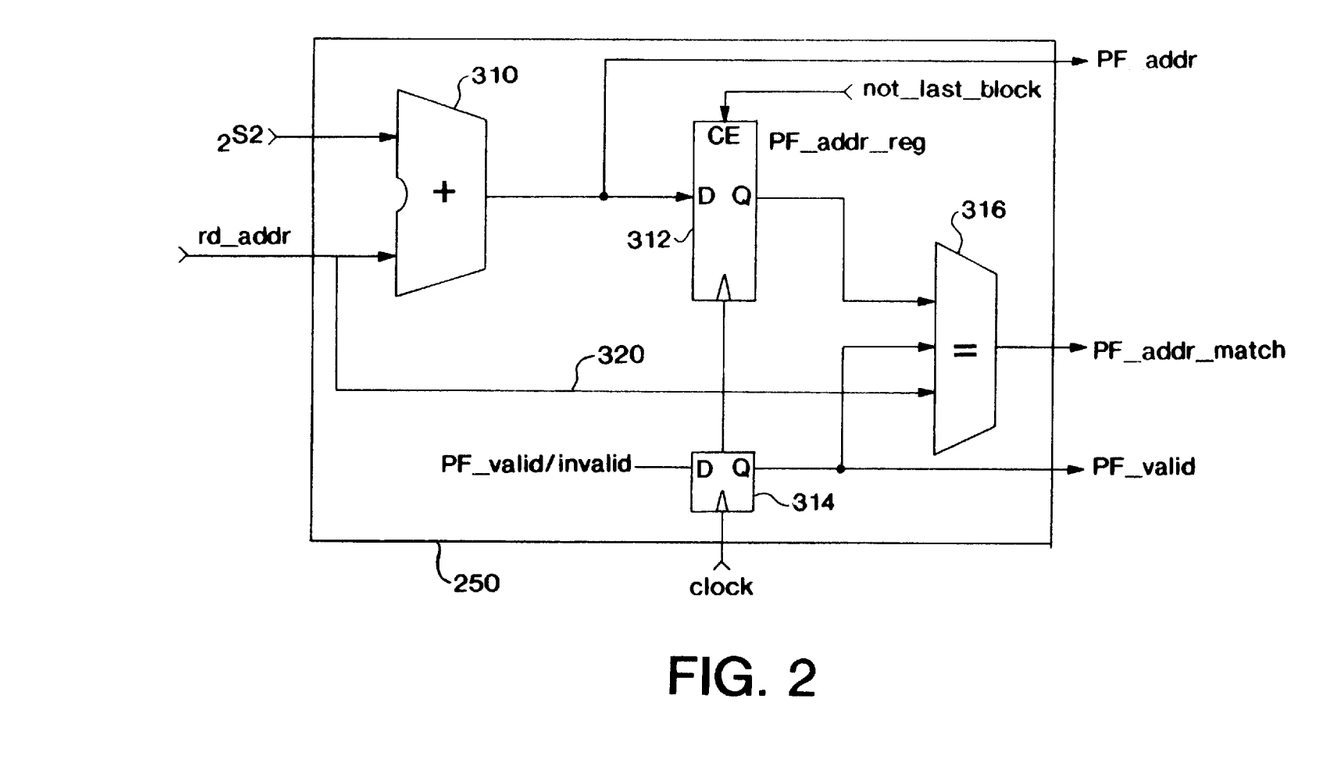
FIG. 2 illustrates the architecture of the prefetch unit of the preferred embodiment.

Referring now to FIG. 2, the internal architecture of the prefetch unit 250 of the preferred embodiment is shown. The basic functions of the prefetch unit 250 are as follows: 1) compute the address of the next sequential data block (i.e. the prefetch address, pfaddr), 2) register the prefetch address of the data block to be prefetched in a prefetch register 312, 3) compare the current read address (rd addr) issued from the ATM core 210 against that of a previous prefetch address registered in the prefetch register 312 during a previous read request cycle, the data currently in a prefetch cache 218 corresponding to the previous prefetch address, 4) signal a PFhit/miss indication corresponding to whether the current read address (rdaddr) matches the previous prefetch address, and 5) update a prefetch cache valid indication maintained in the prefetch unit 250. These and other functions of the prefetch apparatus of the preferred embodiment are described in the following sections.

Figure 3:
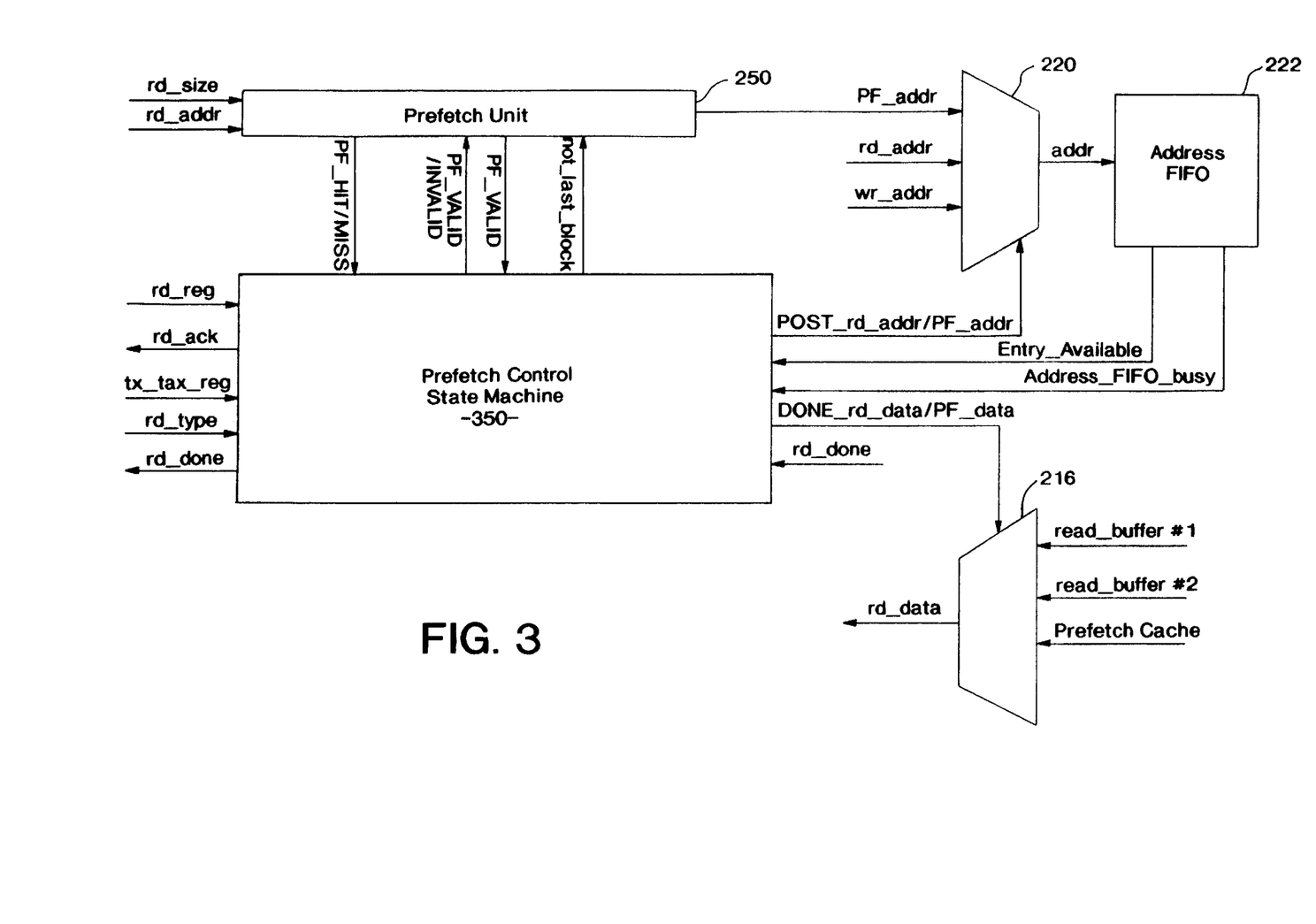
FIG. 3 illustrates the architecture of the prefetch control state machine of the preferred embodiment.

Referring again to FIG. 2, prefetch unit 250 includes adder 310, which receives as inputs the current read request address (rdaddr) and the size of the requested data block as indicated by the rdsize signal output by ATM core 210 as shown in FIG. 1. The adder 310 sums the current read request address (rdaddr) value and the value corresponding to the size of the requested data block. The resulting sum is output as the prefetch address (pfaddr) to multiplexer 220 and to the prefetch register (PFaddrreg) 312. The prefetch address (pfaddr) represents the address of the next contiguous or sequential data block which is likely to be requested after the currently requested block as represented by rdaddr. The prefetch address is registered in register 312 and thereby saved until the subsequent read request cycle. The prefetch address is only registered if: 1) the txlast req signal from the ATM core 210 does not indicate that the current read request is the last request in a plurality of contiguous block transfers, 2) the next data block request will not be for a non-contiguous data block, and 3) the read request is for a data block as indicated by the rdtype signal (notlastblock signal). This limitation is imposed by applying the notlastblock signal, as shown in FIG. 3, to the chip enable (CE) input of register 312 as shown in FIG. 2. By use of the notlastblock signal or a similar signal in an alternative embodiment, the prefetch operation is not wasted on a read cycle that will not be needing the prefetched data block. By qualifying the prefetch with the type of data block, the prefetch operation is made conditional upon the request for a specific type of data. The output of register 312 (i.e. a one-cycle-delayed previous prefetch address) is provided as an input to comparator 316. The current read request address (rdaddr) is also provided as an input to comparator 316 on line 320. A register 314 is used to indicate when the prefetched data block is valid.

A prefetch valid signal (PFvalid) is output by register 314 indicating that the prefetched data is valid. This signal is provided as a third input to comparator 316. Comparator 316 compares the current read request address (rdaddr) with the previous prefetch address corresponding to a data block fetched during the previous cycle.

Comparator 316 outputs a PFhit/miss signal indicating a match or hit indication if the two input addresses are equal and the PFvalid signal indicates valid prefetched data. Comparator 316 outputs a PFhit/miss signal indicating a mismatch or miss indication if the two input addresses are unequal or the PFvalid signal indicates invalid prefetched data. The PFhit/miss signal is used by the prefetch control state machine 350 as shown in FIG. 3 to either immediately provide prefetched data to the ATU core 210 on a hit indication or to execute a memory 205 access cycle on a miss indication. The logic implemented in the prefetch control state machine 350 is described next.

FIG. 3 illustrates the prefetch control state machine 350 which governs the prefetch valid indication (PFvalid), controls read address deposits into the address FIFO 222, and controls access to one of the data buffers 118. The logic implemented in prefetch control state machine 350 is illustrated in flowchart form in FIGS. 4–6. In the following detailed description, reference is made to the logic shown in FIGS. 4–6 with additional references to the corresponding signals shown in FIG. 3.

Figure 4:
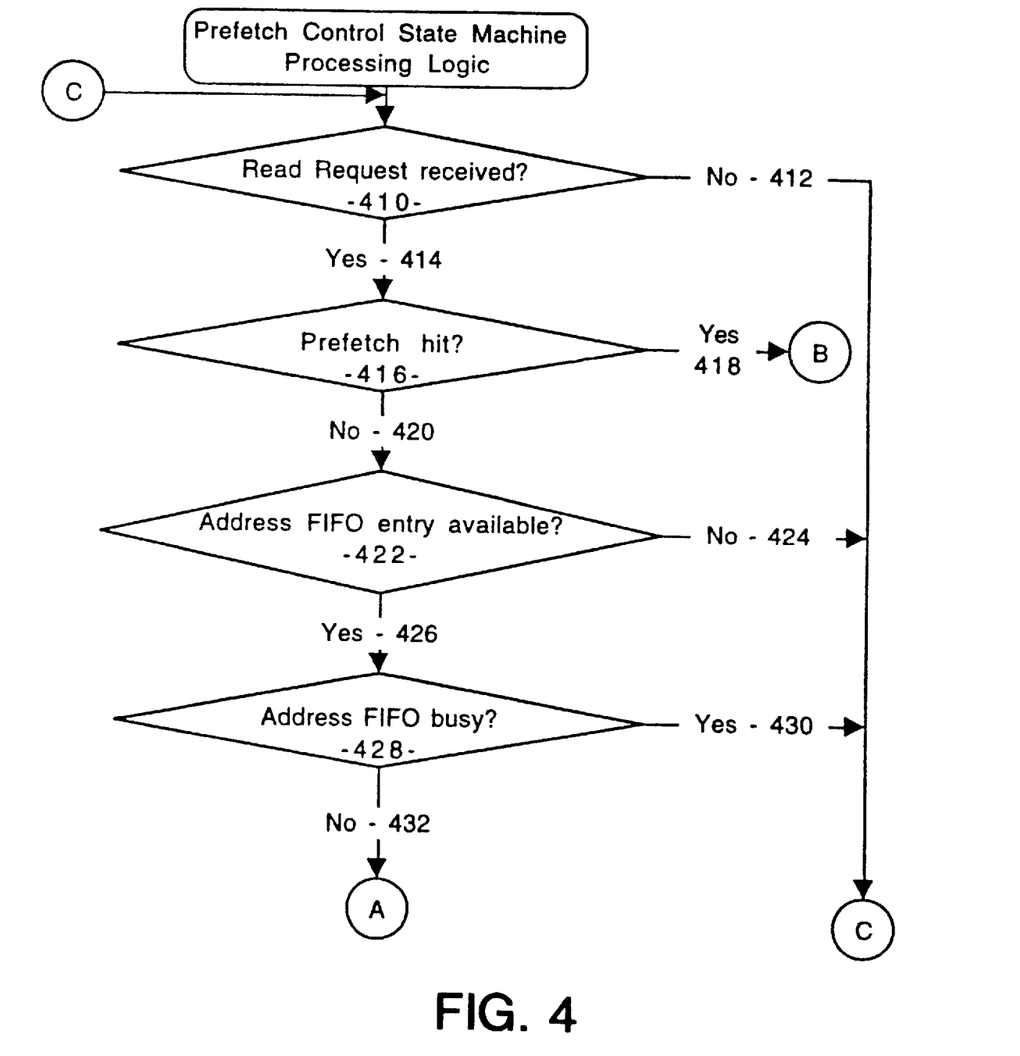
FIGS. 4-6 are flow diagrams illustrating the processing performed by the prefetch control state machine of the preferred embodiment.

Referring now to FIG. 4 and FIG. 3, the prefetch control state machine 350 logic begins by determining if a read request (rdreq signal) has been received (block 410). If not, control returns to C and a new cycle is begun. If so, path 414 is taken and it is determined if there was a prefetch hit (PF hit signal) condition indicated by the prefetch unit 250. If there is a prefetch hit, control passes to B shown in FIG. 6. If not, the availability of an address FIFO entry is determined (block 422). If there is no available entry, control returns to C. If an entry is available, path 426 is taken and it is determined if the address FIFO 222 is busy. If so, control returns to C. If not, control passes to A shown in FIG. 5.

Figure 5:
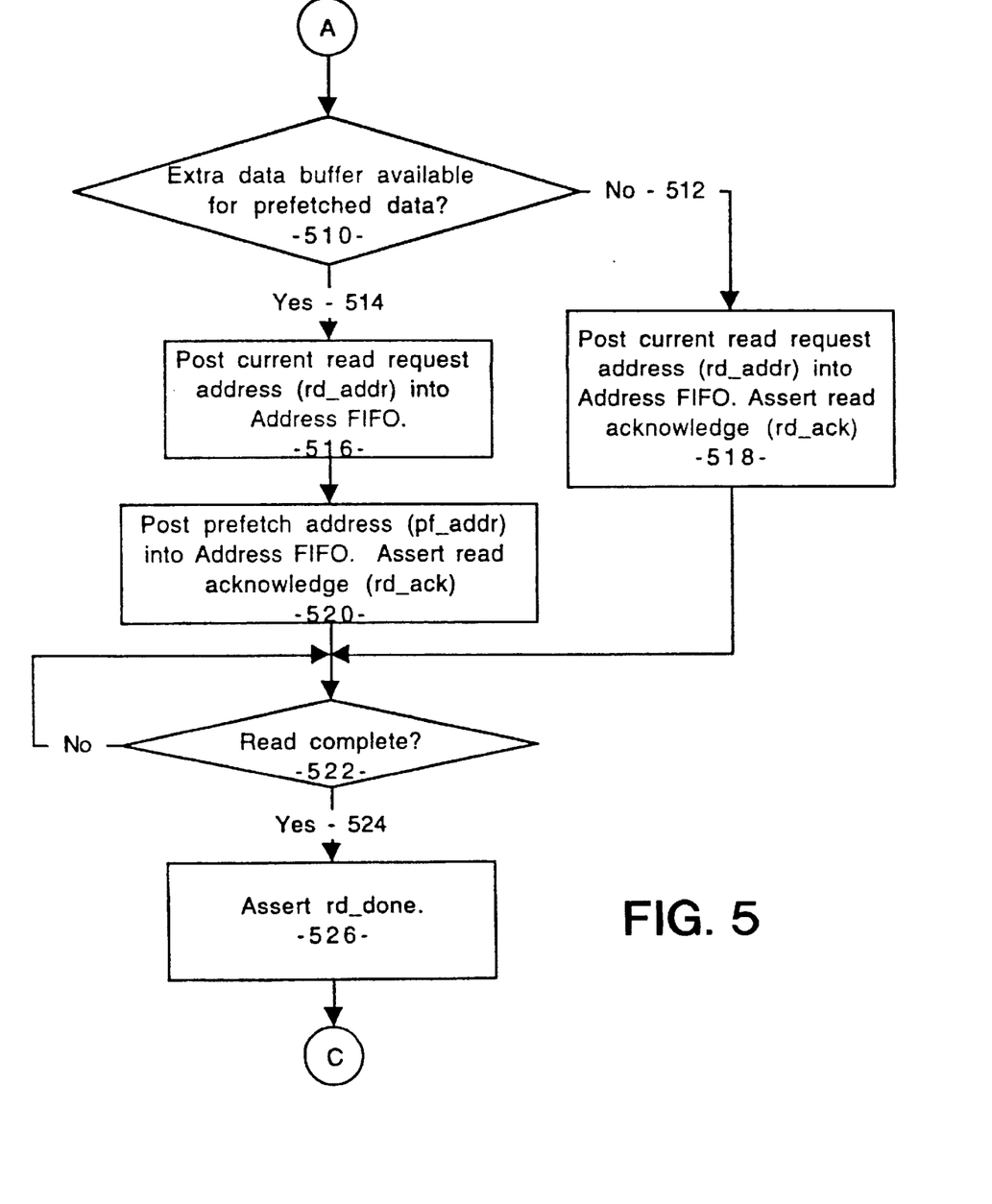

Referring now to FIGS. 5 and 3, it is determined if an extra data buffer 118 is available for storage of the prefetched data. If so, path 514 is taken and the current read request address (rdaddr) and the prefetch address (pf addr) are posted to the address FIFO 222 (blocks 516 and 520). Also, the rdack signal is asserted in block 520 to signal the capture of the read address. If an extra data buffer 118 is not available for storage of the prefetched data, path 512 is taken and only the current read request address (rd addr) is posted to the address FIFO 222 (block 518). Also, the rdack signal is asserted in block 518 to signal the capture of the read address. When the memory 205 has completed the storage of the requested data to the appropriate data buffer 118, the prefetch control state machine 350 asserts the rddone signal to indicate to the ATM core 210 that the requested data is available on the rddata bus 234. Control then returns to C shown in FIG. 4 for the beginning of the next cycle.

Figure 6:
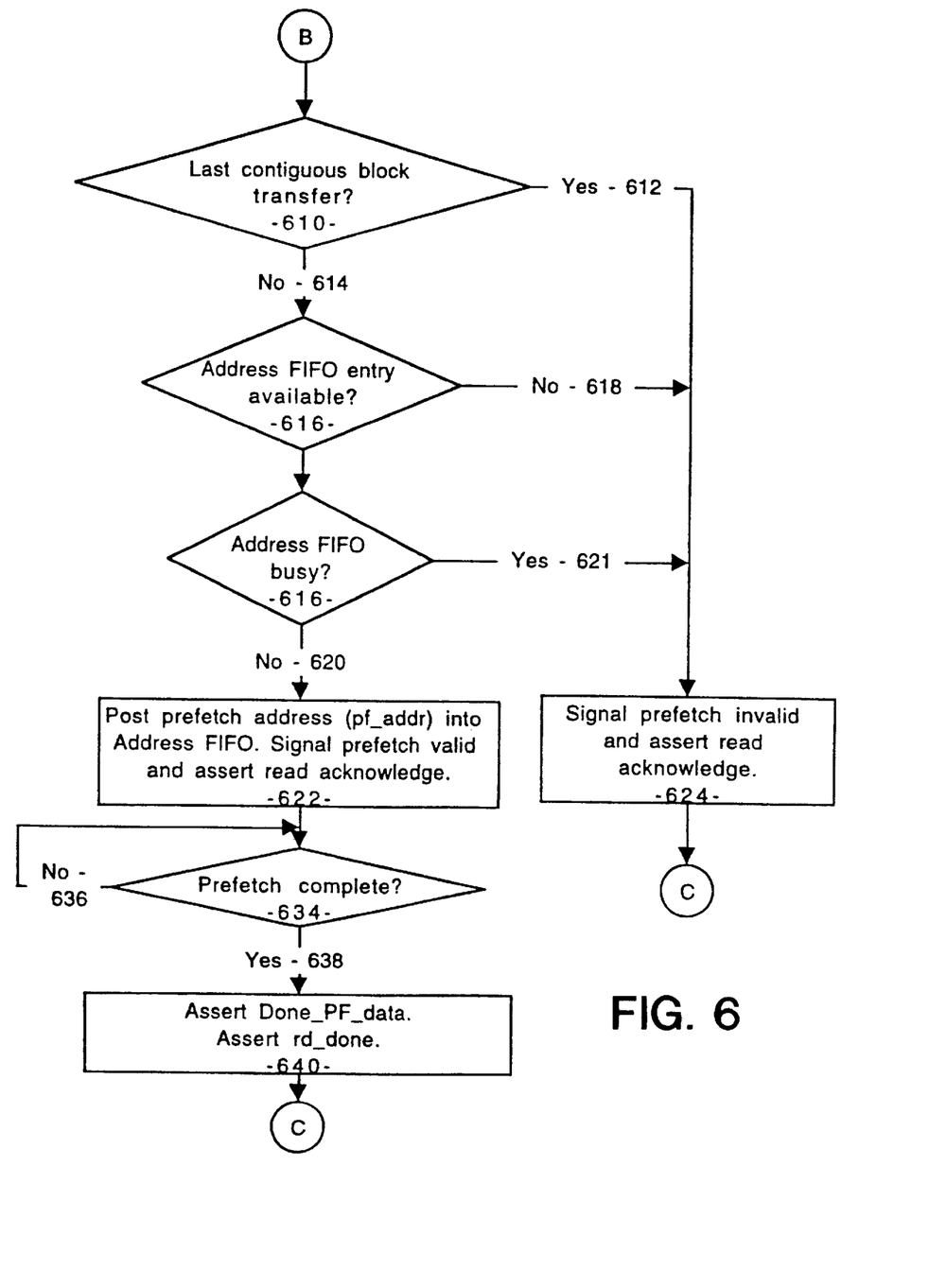

Referring now to FIGS. 6 and 3, the prefetch control state machine 350 logic for a prefetch hit condition is illustrated. If the current request is for the last block in a contiguous set of blocks (txlastreq and notlastblock signals), the prefetch invalid state (PFValid/Invalid signal) is deasserted to the invalid condition and the read acknowledge signal (rd ack) is asserted (block 624). If this is not the last block, path 614 is taken and the address FIFO 222 is checked for an available entry. If none is found, block 624 is executed as described above. If an address FIFO 222 entry is available (path 620), it is determined if the address FIFO 222 is busy. If so, control returns to C. If not, block 622 is executed. The prefetch address (pfaddr) is posted to the address FIFO 222. Also, the prefetch valid signal (PFvalid/invalid signal) is set to a valid state and the read acknowledge signal (rdack) is asserted (block 622). When the memory 205 has completed the storage of the requested data to the prefetch cache buffer 218, the prefetch control state machine 350 asserts the Donepfdata signal and asserts the read done signal (rddone) to indicate to the ATM core 210 that the requested prefetched data is available on the rddata bus 234 (block 640). Control then returns to C shown in FIG. 4 for the beginning of the next cycle.

There are several read access cases which are described in more detail as follows: 1) Prefetch disabled (normal read operation); 2) Prefetch enabled, TXDB access, prefetch cache miss; 3) Prefetch enabled, TXDB access, prefetch cache hit; and 4) Prefetch enabled, non-TXDB access.

Prefetch disabled—normal read case

A burst of up to $2^{SZ}$ bytes of data is read from memory 205 starting at the location specified on the rdaddr bus 230. The address on the rdaddr bus 230 from the ATM core 210 is placed into the address FIFO 222. Alternating bursts of data are deposited into either read data buffer #1 of data buffers 118 or read data buffer #2 of data buffers 118. The memory 205 or other bus interface logic asserts a signal, rddone, as shown in FIG. 3, which indicates the requested data is in one of read data buffers 118 and ready for ATM core 210 acquisition. Data is read alternatingly from the read data buffers 118 onto the rddata bus 234 by the ATM core 210.

Prefetch Enable, TXDB Access, Prefetch Cache Miss

A prefetch cache miss can be due to the valid signal PF valid indicating invalid or an address mismatch. If tx lastreq signal is asserted indicating the end of sequential access to the TXDB, no prefetch is attempted and the data is simply retrieved normally. If txlastreq is desasserted, the prefetch control state machine 350 checks to see if there are resources (i.e. address FIFO 222 and data buffer 118 space) available to do a prefetch access. This requires fetching two bursts, the first burst being the size indicated on the rdsize signal and the second burst being $2^{SZ}$ bytes of data in the preferred embodiment. The resources required for this are two entries in the address FIFO 222 and two read buffers 118. Should only one address FIFO 222 entry or one data buffer 118 be available, a standard access is made and the prefetch cache valid signal PFvalid is set to an invalid state. Should two entries and two buffers be available, the address on the rdaddr bus is placed into the first address FIFO 222 entry followed by (rdaddr+$2^{SZ}$) placed into the second entry. When data is returned from memory 205 at address rdaddr, the data is placed into a read buffer 118 (RBn) and a signal rddone is asserted. The data from (rd addr+$2^{SZ}$) is placed into the next input read buffer 118

(RBn+1). When the prefetch control state machine 350 deposits the second entry into the address FIFO 222, the prefetch control state machine 350 also sets the prefetch cache valid bit (PFvalid/invalid) to a valid state thereby legitimizing that address which has also been latched into PF addrreg 312. In this manner, the present invention conditionally prefetches data blocks based on resource availability.

It should be noted that this initial two burst access should be faster than the rate which the ATM core 210 would initiate the two accesses sequentially in order to achieve enhanced performance.

Should the valid signal (PFvalid) be valid but the prefetch miss be due to an address mismatch, a read data buffer 118 rotation is not made and the incoming data from memory 205 overwrites the data previously written into that buffer. This situation will occur should a prefetch of $2^{SZ}$ bytes of a TXDB be placed into the prefetch cache but the next read access by the ATM core 210 be to either a non-TXDB or to a non-contiguous address. Note that the output side of the read buffers 118 always rotates after each rddone signal.

Prefetch Enable, TXDB Access, Prefetch Hit

A prefetch hit is registered when the prefetch cache valid signal lo (PFvalid) is valid and the address on rdaddr bus 230 matches the contents of PFaddrreg 312. In this case, the data to be returned to the ATM core 210 will come from the prefetch cache 218 of data buffers 118. If that data is present at the time of the rdreq from the ATM core 210, the rddone signal is asserted quickly. If the data is still being returned from host memory 205, rddone is asserted once the burst is contained in the prefetch cache 218.

If txlastreq is asserted, the prefetch cache valid signal (PFvalid) gets cleared to an invalid condition and no prefetch is attempted. If txlastreq is deasserted and sufficient resources are present, a prefetch is made. This requires fetching one burst so only one address FIFO 222 entry and one free data buffer 118 are necessary. If one or both of these resources are unavailable, the prefetch is not made and the prefetch cache valid signal (PFvalid) gets cleared to an invalid condition. If both resources are available, a read access is made to (rdaddr+$2^{SZ}$) for $2^{SZ}$ bytes, (rdaddr+$2^{SZ}$) is placed into PFaddr reg 312, and the valid signal (PFvalid) gets set to a valid condition. Should a prefetch occur, an input read buffer 118 rotation is made.

Prefetch Enabled, non-TXDB Access

This is similar to the case described above for a Prefetch enabled, TXDB access, prefetch cache miss situation in that this results in a prefetch cache miss condition. If the prefetch cache valid signal (PFvalid) is set to a valid condition, an input read buffer 118 rotation is not made and the descriptor read data from memory 205 will overwrite the previously prefetched $2^{SZ}$ bytes of TXDB data. If the prefetch cache valid signal (PFvalid) is cleared to an invalid condition, an input read buffer 118 rotation is made.

The prefetch mechanism of the preferred embodiment does resource checking and only prefetches if sufficient resources are present. If insufficient storage for either data or address information exists, prefetch is not done.

A signal from the ATM core 210, "txlastreq", qualifies each access request to a read data buffer 118. If asserted, this signal indicates that this is the last burst access needed to complete reading the data buffer from memory 205. If not asserted, at least one more burst access will be issued starting at the byte address following the end of the current read data buffer access. This signal, when not asserted, also indicates one full burst can be made without the access entering an unmapped system memory page. Qualifying prefetch with this signal prevents an unnecessary prefetch at the end of a data buffer access allowing this prefetch scheme to use no additional bus bandwidth than when prefetch is disabled.

To reduce complexity, the prefetch mechanism allows a read access which misses the prefetch cache to invalidate prefetched data and overwrite the contents of the prefetch cache buffer given TXDB accesses are characterized predominantly by a succession of uninterrupted reads to the data buffer.

By only accessing additional data one time at the beginning of the TXDB access, prefetch encroachment on other bus accesses (eg. RXDB writes, descriptor reads and writes) is minimized.

Thus, a prefetch apparatus for optimizing data block access bandwidth in an ATM network system has been described.

The specific arrangements and methods described herein are merely illustrative of the principles of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. In a computer network, a prefetch apparatus for optimizing data block access bandwidth by prefetch accessing a data block prior to demand, the prefetch apparatus comprising:

circuitry configured to compute a prefetch address of a next sequential data block given an address of a requested data block;

circuitry configured to compare a current request address against a previously computed prefetch address;

circuitry configured to generate a hit/miss indication corresponding to whether the current request address matches the previously computed prefetch address circuitry configured to retain prefetched data in at least one of a plurality of read data buffers; and circuitry configured to control one of said plurality of read data buffers to allow said prefetched data retaining circuitry to have access to said controlled read data buffer, said controlled read data buffer rotating its position amongst said plurality of read data buffers.

2. The prefetch apparatus as claimed in claim 1 further including:

circuitry configured to update a prefetch cache valid indication when said prefetch address is computed.

3. The prefetch apparatus as claimed in claim 1 further including:

circuitry configured to register the prefetch address for a subsequent request cycle.

4. The prefetch apparatus as claimed in claim 1 further including:

circuitry configured to disable a prefetch operation if a last block condition is detected.

5. The prefetch apparatus as claimed in claim 1 further including:

circuitry configured to receive a prefetched data block while a requested data block is being presented.

6. The prefetch apparatus as claimed in claim 1 further including:

circuitry configured to conditionally prefetch based on resource availability.

7. The prefetch apparatus as claimed in claim 6 wherein said resource is an input data buffer.

8. The prefetch apparatus as claimed in claim 7 wherein said resource is an address FIFO entry.

9. The prefetch apparatus as claimed in claim 1 further including:

circuitry configured to conditionally prefetch based on a type of information requested.

10. The prefetch apparatus as claimed in claim 1 further including:

circuitry configured to receive a prefetched data block while a requested data block is being presented;

circuitry configured to update a prefetch cache valid indication when said prefetch address is computed; and circuitry configured to prevent said circuitry configured to receive said prefetched data block and for overwriting data previously written into a buffer if said prefetch cache valid indication is not asserted.

11. The prefetch apparatus as claimed in claim 1 further including:

circuitry configured to store said prefetch address of a next sequential data block into an address FIFO.

12. In a computer network, a method for prefetch accessing a data block prior to demand, the method comprising the steps of:

computing a prefetch address of a next sequential data block given an address of a requested data block;

comparing a current request address against a previously computed prefetch address;

generating a hit/miss indication corresponding to whether the current request address matches the previously computer prefetch address retaining prefetched data in one of a plurality of read data buffers; and controlling one of said plurality of read data buffers to allow said prefetched data have access to said controlled read data buffer, wherein said controlled read data buffer rotating its position amongst said plurality of read data buffers.

13. The method as claimed in claim 12 further including a step of:

updating a prefetch cache valid indication when said prefetch address is computed.

14. The method as claimed in claim 12 further including a step of:

registering the prefetch address for a subsequent request cycle.

15. The method as claimed in claim 12 further including a step of:

disabling a prefetch operation if a last block condition is detected.

16. The method as claimed in claim 12 further including a step of:

receiving a prefetched data block while a requested data block is being presented.

17. The method as claimed in claim 12 further including a step of:

conditionally prefetching based on resource availability.

18. The method as claimed in claim 17 wherein said resource is an input data buffer.

19. The method as claimed in claim 17 wherein said resource is an address FIFO entry.

20. The method as claimed in claim 12 further including a step of:

conditionally prefetching based on a type of information requested.

21. The method as claimed in claim 12 further including a step of:

receiving a prefetched data block while a requested data block is being presented;

updating a prefetch cache valid indication when said prefetch address is computed; and preventing said circuitry configured to receive said prefetched data block and for overwriting data previously written into a buffer if said prefetch cache valid indication is not asserted.

22. The method as claimed in claim 12 further including a step of:

storing said prefetch address of a next sequential data block into an address FIFO.

* * * * *